(12) United States Patent
Claus et al.

(10) Patent No.: US 8,312,098 B2
(45) Date of Patent: *Nov. 13, 2012

(54) SERIAL COMMUNICATIONS PROTOCOL FOR SAFETY CRITICAL SYSTEMS

(75) Inventors: Michael J. Claus, Newport Coast, CA (US); Hao V. Nguyen, Grand Prairie, TX (US)

(73) Assignee: Abbott Medical Optics Inc., Santa Ana, CA (US)

( * ) Notice: Subject to any disclaimer, the term of this patent is extended or adjusted under 35 U.S.C. 154(b) by 585 days.

This patent is subject to a terminal disclaimer.

(21) Appl. No.: 11/558,429

(22) Filed: Nov. 9, 2006
(Under 37 CFR 1.47)

(65) Prior Publication Data
US 2008/0115146 A1    May 15, 2008

(51) Int. Cl.
G06F 15/16   (2006.01)
G06F 11/00   (2006.01)
G06F 15/173   (2006.01)

(52) U.S. Cl. ........ 709/208; 709/224; 709/230; 709/237; 714/47.1; 714/706; 714/712; 719/313

(58) Field of Classification Search .................. 709/208, 709/209; 370/252; 719/313
See application file for complete search history.

(56) References Cited

U.S. PATENT DOCUMENTS

| | | | |
|---|---|---|---|
| 4,991,184 A | | 2/1991 | Hashimoto |
| 5,726,638 A | | 3/1998 | Kobayashi |
| 5,997,528 A | * | 12/1999 | Bisch et al. ........................ 606/1 |
| 6,069,929 A | | 5/2000 | Yabe et al. |
| 6,072,944 A | * | 6/2000 | Robinson ..................... 716/117 |
| 6,074,345 A | * | 6/2000 | van Oostrom et al. ........ 600/300 |
| 6,182,252 B1 | | 1/2001 | Wong et al. |
| 6,301,610 B1 | * | 10/2001 | Ramser et al. ................ 709/208 |
| 6,751,196 B1 | * | 6/2004 | Hulyalkar et al. ............ 370/252 |
| 6,763,040 B1 | * | 7/2004 | Hite et al. ..................... 370/522 |
| 7,710,977 B2 | * | 5/2010 | Kitazawa et al. ........ 370/395.42 |
| 7,882,419 B2 | * | 2/2011 | Takakuwa ..................... 714/761 |
| 2002/0183616 A1 | * | 12/2002 | Toews et al. .................. 600/432 |
| 2003/0065536 A1 | * | 4/2003 | Hansen et al. ..................... 705/2 |
| 2003/0066016 A1 | * | 4/2003 | Wehage ........................ 714/781 |
| 2003/0139665 A1 | * | 7/2003 | Takayama et al. ............ 600/407 |
| 2004/0037566 A1 | * | 2/2004 | Willebrand et al. .......... 398/115 |
| 2005/0096080 A1 | | 5/2005 | Choi et al. |
| 2005/0249123 A1 | | 11/2005 | Finn |
| 2005/0262216 A1 | | 11/2005 | Kashiwabara et al. |

(Continued)

*Primary Examiner* — Ashok Patel
*Assistant Examiner* — Linglan Edwards
(74) *Attorney, Agent, or Firm* — Abbott Medical Optics Inc.

(57) ABSTRACT

A method and system of establishing communications between at least two independent software modules in a safety critical system, such as a medical system, is provided. The design comprises providing a media connection between software modules, wherein the software modules employ a communications protocol and participate in a bi-directional master-slave relationship between a master module and a slave module. The design further comprises sending an arbitrary length of data between the master and slave modules, wherein the arbitrary length of data is used by the master module to control and obtain status from the slave module, and sending arbitrary data further enables the slave module to return data and status information to the master module. The design also employs a safety critical communications watchdog between the master and slave modules, wherein the safety critical communications watchdog monitors communications quality between the master and slave modules. The protocol comprises bytes transmitted using a packet consisting of a start indication, a message identifier, an optional service identifier, a class identifier, an arbitrary length of data pertinent to the medical device comprising optional data, a checksum, and a checksum complement.

18 Claims, 5 Drawing Sheets

U.S. PATENT DOCUMENTS

| | | |
|---|---|---|
| 2006/0250973 A1 | 11/2006 | Trott |
| 2006/0277450 A1 | 12/2006 | Zaki et al. |
| 2007/0070904 A1* | 3/2007 | King et al. .................... 370/235 |
| 2007/0189180 A1 | 8/2007 | Schelén et al. |
| 2007/0217387 A1* | 9/2007 | Choi et al. .................... 370/342 |
| 2007/0250627 A1* | 10/2007 | May et al. .................... 709/225 |

* cited by examiner

SERIAL COMMUNICATIONS PROTOCOL FOR SAFETY CRITICAL SYSTEMS

BACKGROUND OF THE INVENTION

1. Field of the Invention

The present invention relates generally to the art of medical systems, and more specifically to managing data communications between multiple independent subsystems forming a safety critical system.

2. Description of the Related Art

Today's safety critical systems, such as automated medical system products, for example surgical equipment, may be constructed as a collection of two or more independent modules or subsystems. Constructing a suite of independent modules affords medical system product designers and manufactures the ability to create and deploy subsystems that perform specific functions that are a subset of functions of the complete device or system.

Designs that take advantage of allocating functions to a plurality of specialized modules must include a communications mechanism to enable the modules to interact with each other. Modules may share or communicate control and status information between each other to realize the entire system functionality. These communications are typically realized using a communications protocol that specifies a uniform or consensus format that the modules or subsystems use to transmit and receive information to each other.

Traditionally, medical system products transmit control and status signals between subsystems over a fixed wire or cable using a standard cable interface, such as Universal Serial Bus, Ethernet, etc. Furthermore, these products frequently employ a variety of standardized communications protocols. Some of the most frequently used protocols include: XModem, ZModem, Kermit, MNP, and CCITT V.42. However, each of these currently available protocols exhibits limitations and restrictions that make them unacceptable in the design of a safety critical system. Each of these protocols may exhibit excessive overhead, high bandwidth, lack of system integrity, limited error detection and error correction, and/or a need for excessive processing resources to execute the protocol.

Current standardized communications protocols are problematic in that they require excessive overhead or additional information that must be transmitted with the original data to facilitate control of the protocol by the sending and receiving modules or subsystems. Excessive communications protocol overhead, or poor protocol efficiency, can require additional transmission media (i.e. fixed wire or cable) bandwidth to realize exchange of control and status information between modules. In addition, the excessive overhead requires additional significant processing resources (i.e. CPU cycles, memory, etc.) to execute the protocol. Moreover, this increase in required bandwidth and processing resources adds to cost and complexity to deliver each module.

A major commercial problem with respect to the above mentioned known communications protocols is the lack of a reliable communications watchdog mechanism. A communications watchdog can effectively trigger a control system, such as a surgical device, to switch to a safe state when a module or subsystem exhibits a fault that may result in a dangerous overall system behavior, that is, loss of control of the surgical instrument and potentially severe harm or even death of the patient. Without the benefit of a communications watchdog, current designs do not provide a sufficient level of system integrity for such safety critical systems as surgical devices. Overall systems integrity is paramount to designing and deploying safety critical systems. Thus, today's designers are faced with a difficult and complex implementation challenge to ensure constant communication between independent modules to provide the required level of safety in an operating theater environment.

Furthermore, the protocol employed in the construction of safety critical systems must provide the ability for two modules to send arbitrary data between themselves and to ensure the integrity of that data. The protocol preferably enables either the transmitter or the receiver to detect that an error in the information has been introduced during the transmission, and enables that error to be corrected via the communications protocol.

Based on the foregoing, it would be advantageous to provide a communications protocol for use in safety critical systems that overcomes the foregoing drawbacks present in previously known protocols used in the design of medical systems.

SUMMARY OF THE INVENTION

According to one aspect of the present design, there is provided a method for establishing communications between at least two independent software modules in a safety critical system. The method comprises providing a media connection between software modules, wherein the software modules employ a communications protocol and participate in a bi-directional master-slave relationship between a master module and a slave module. The method further comprises sending a request message comprising an arbitrary length of data comprising optional data between the master and slave modules, wherein the arbitrary length of data comprising optional data is used by the master module to control and obtain status from the slave module, and the request message further enables the slave module to return data and status information to the master module, and employing a safety critical communications watchdog between the master and slave modules, wherein the safety critical communications watchdog monitors communications quality between the master and slave modules.

According to a second aspect of the present design, there is provided a medical device configured to manage communications therein. The device comprises a plurality of software modules comprising at least two software modules configured in a master-slave relationship, and a media connection between a plurality of software modules. The plurality of software modules are configured to communicate using a bandwidth efficient communications protocol. The plurality of software modules provide a medical event safety critical communications watchdog Function to verify communications integrity over the media connection.

According to a third aspect of the present design, there is provided a bandwidth efficient communications protocol for communicating between software modules in a medical device. The communications protocol comprises bytes transmitted using a packet consisting of a start indication, a message identifier, an optional service identifier, a class identifier, an arbitrary length of data pertinent to the medical device comprising optional data, wherein length of the arbitrary length of data depends upon at least one of the class identifier, message identifier, and optional service identifier, a checksum, and a checksum complement.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
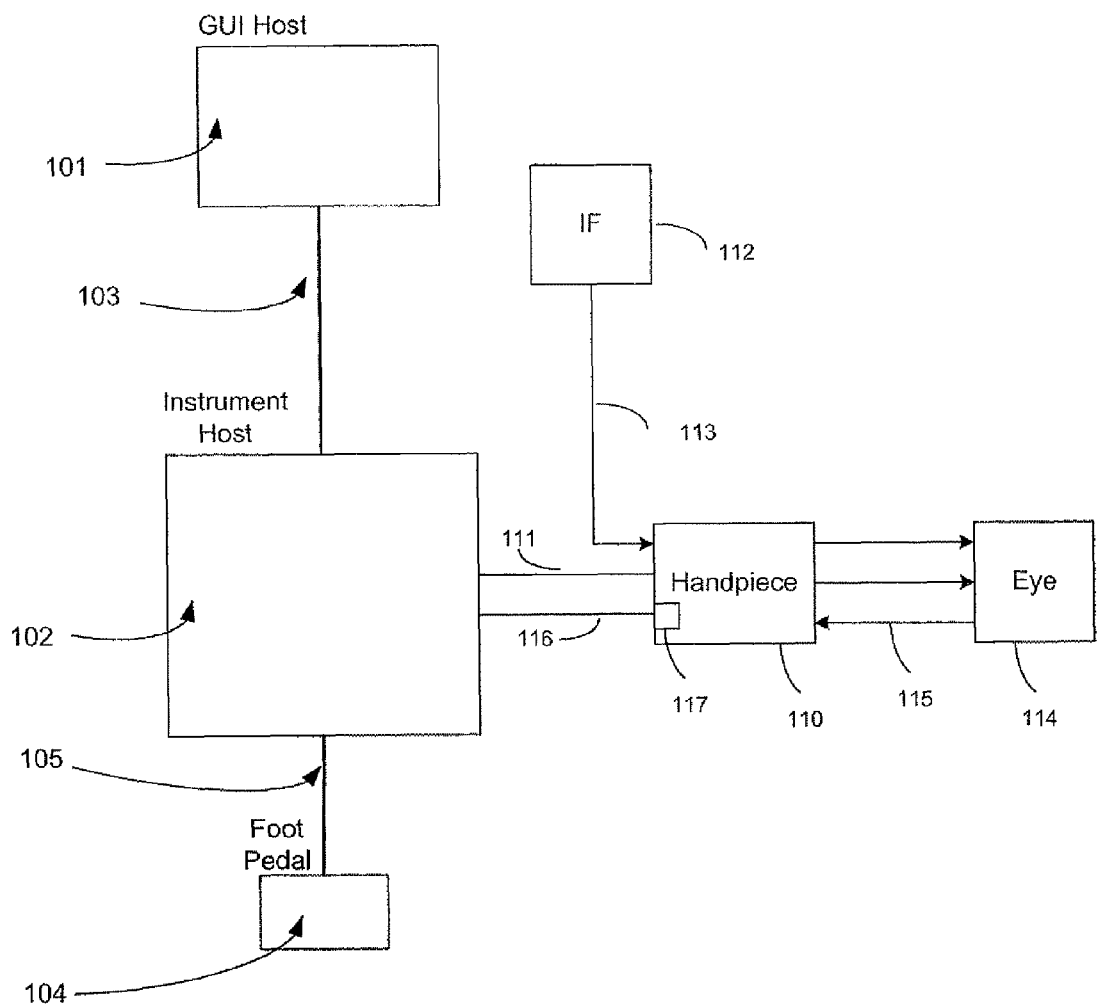
FIG. 1 is a block diagram illustrating the components and interfaces of an exemplary medical system employing the novel communications protocol of the present design.

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The present design provides a system and method for managing data communications between multiple independent subsystems in a safety critical system. The present design may provide a serial communications protocol for sending and receiving arbitrary data between two modules and ensuring data integrity. The modules, or subsystems, may perform specific functions that are a sub-set of the complete device or system. With the communications provided by the present design, the modules or subsystems may perform as two independent software entities. Each software entity may provide the applications and the appropriate underlying operating systems software. The present designs communications protocol may enable either module to detect that an error in the information has been introduced during the transmission, and for that error to be corrected via the communications protocol.

This serial communications protocol may be used between two modules in a safety critical system communicating over relatively low bandwidth asynchronous media, for example RS-232 or RS-485 serial cables. The present design may be configured to provide a communications watchdog facility capable of monitoring intra-module communications on a predefined time interval, detecting intra-module communications failures, and taking appropriate safety measures in response to a detected fault. The present design may send data between two modules in the form of packets where the packets are configured to efficiently transmit additional information to facilitate control of the protocol by the sending and receiving modules. In this arrangement, the present design may provide an efficient communications protocol that minimizes the amount of communications bandwidth required to support the transmission of overhead information on the transmitted data.

The present design is directed to managing an accurate, reliable, and efficient arrangement for transmitting and receiving data over a fixed wire or cable between independent modules in a system such as a safety critical system. However, the present design is not limited to a fixed cable implementation, and may use a wireless over-the-air communications media. The wireless over-the-air communications may be realized using a radio, light wave (e.g. infrared) or other communications technique that does not require a physical connection. Examples of current wireless devices that may receive and transmit data include, but are not limited to, those devices meeting or complying with the Institute of Electrical and Electronics Engineers (IEEE) 802.11 and Ericson Bluetooth specifications for short range radio technology, or an Infrared Data Association (IrDA) light wave technique.

While the present design may be used in various environments and applications, it will be discussed herein with a particular emphasis on a medical or hospital environment, where a surgeon or health care practitioner performs. For example, embodiments of the present design may include a phacoemulsification surgical system, vitrectomy system, or combined phaco-vitrectomy system comprising an independent graphical user interface (GUI) module, an instrument host module, and a controller module, such as a foot switch, to control the surgical system.

FIG. 1 illustrates a phacoemulsification system in block diagram to show the components and interfaces for a safety critical medical system in accordance with the present design. The particular embodiment illustrated in FIG. 1 contemplates that the GUT host 101 module and instrument host 102 module are connected by a serial communication cable 103 for the purposes of controlling the surgical instrument host 102 by the GUT host 101. A foot pedal 104 switch module may transmit control signals relating internal physical and virtual switch position information as input to the instrument host 102 over serial communications cable 105. The present design may employ the same novel 'lightweight' or bandwidth efficient communications protocol for GUI host to instrument host communications and instrument host to foot pedal switch communications.

The phacoemulsification system has a handpiece/needle 110 that includes a needle and electrical means, typically a piezoelectric crystal, for ultrasonically vibrating the needle. The instrument host 102 supplies power on line 111 to a phacoemulsification handpiece/needle 110. An irrigation fluid source 112 is fluidly coupled to handpiece/needle 110 through line 113. The irrigation fluid and ultrasonic power are applied by handpiece/needle 110 to a patient's eye, or affected area or region, indicated diagrammatically by block 114. Alternatively, the irrigation source may be routed to the eye 114 through a separate pathway independent of the handpiece. The eye 114 is aspirated by the instrument host 102 peristaltic pump (not shown) through line/handpiece needle 115 and line 116. A switch 117 disposed on the handpiece 110 may be utilized as a means for enabling a surgeon/operator to select an amplitude of electrical pulses to the handpiece via the instrument host and GUT host. Any suitable input means, such as, for example, a foot pedal 104 switch may be utilized in lieu of the switch 117.

The system and method comprising the present design for managing communications between two independent modules within a safety critical medical system will be described.

The present discussion is intended to provide a basic foundation for low overhead, reliable, bi-directional communications between two independent modules. For simplicity, the present design system and method will be described for the communications path between the GUI host module and the instrument host module that are part of a phacoemulsification machine, however the description may be applicable to any two modules in communication with one another comprising part of or the entire medical system. In this configuration, the control and feedback of the phacoemulsification machine may be accomplished by exchanging data between the GUI host and the instrument host. In this arrangement, the GUI host may provide the graphical user interface for controlling the instrument host, and the instrument host may provide control for the actual surgical devices connected to the instrument host.

In FIG. 1, the GUI host 101 and instrument host 102 may be two separate independent software execution environments comprising the medical system applications software and the underlying operating systems. The present design may provide control and feedback of the medical system by exchanging data between the GUI host 102 and the instrument host, between software modules within the instrument host, between the instrument host and modules external to the instrument host 101 and/or GUI host 102, or between software modules external to the instrument host 101 and/or GUT host 102. The present design may realize this data exchange using a novel lightweight or bandwidth efficient communications protocol configured to support a master-slave protocol relationship. The communications protocol may be implemented in both the GUI host 102 and instrument host 101 and arranged to enable either module to act as the master and the other as the slave module. More than one software module may employ the protocol and aspects described herein.

General Aspects of the Protocol

The present design system and method communications protocol features data packets, message formats, and a communications watchdog. The present design may support two messaging formats when sending data packets via this lightweight protocol method, being either explicit or implicit format. The present design's explicit message format may contain a description of the data object contained in the message, for example a ServiceID and ClassID specified in the message header, wherein an implicit message may not contain a data object description.

Figure 2A:
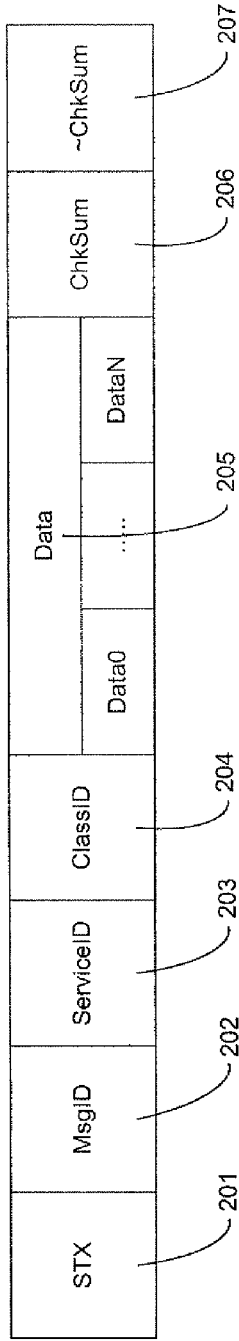
FIG. 2A shows the data packet byte structure for an explicit request message in accordance with the present design.
Figure 2B:
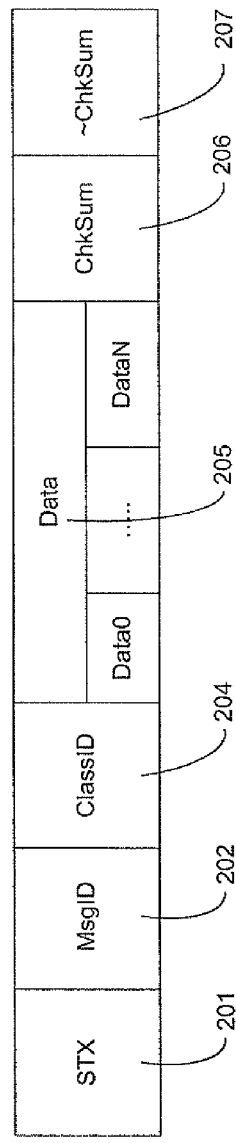
FIG. 2B represents the data packet byte structure for an explicit response message in accordance with the present design.

The present design may enable data transmission in an explicit message between two modules in the form of data packets. The present design may construct packets that represent a collection of 8-bit bytes. The system may interpret each packet as a single item of data. Data packets transmitted may include the following bytes: a Start of Text (STX), a message ID (MsgID), a service ID (ServiceID), a class ID (ClassID), arbitrary length of data, Checksum (ChkSum), and ~Checksum (~ChkSum) as illustrated in FIG. 2A.

Each explicit request message transmitted by the master module, in accordance with the present design, may contain an STX 201 byte comprising an ACSII code with a value such as 0x02 in the first byte to indicate the start of a new message frame. The MsgID 202 may provide a description of the type of message the packet contains. The types of valid MsgID may include explicit requests, explicit acknowledge, explicit response, implicit request, and implicit response. The ServiceID 203 may provide a description of what the receiving entity (i.e. slave module) is to do with this message. The ServiceID provides the receiving module with the service to be performed on the request sent by the master module. The ServiceID byte is optional depending on the value of the MsgID. Some MsgID values do not require any ServiceID. In this situation, the present protocol may eliminate this byte from the packet. Appropriate values of the ServiceTD are dependent on the MsgID. The protocol may include the following ServiceID's: Get, Set, Start, Stop, and Shutdown. The ClassID 204 may provide a description of the data contained within the packet. The MsgID and ServiceID may define appropriate values for this byte. Not all MsgID and ServiceID combinations require a ClassID. In this situation, the protocol may eliminate this byte from the packet.

The ClassID, if present, may contain an identifier for one of up to 256 possible predefined data objects to indicate which object the attached data belongs, where the object may be sent by the master module and interpreted by the slave module. The data 205 transmitted may be of arbitrary length wherein the number of bytes is dependent upon the ClassID. If no ClassID is present, the data length is then dependent upon the MsgID and ServiceID combination. The objects data may be stored in the field represented by Data0 to DataN. While data 205 and data 305 are shown as having multiple component bytes (Data0 through DataN in certain instances) in FIGS. 2A, 2B, 2C, and 3B, in reality data 205 and data 305 may potentially have a data length of zero bytes, as data bytes in general and data 205 and data 305 specifically are optional in these messages and in this design. The protocol may include a simple additive ChkSum 206 byte that stores the modulo-2 addition of all the bytes in the message, excluding its complement byte, itself, and the STX byte. Furthermore, ~ChkSum 207 may store the 1's complement of ChkSum 206. Although the protocol described herein is limited to 256 different MsgID's, ServiceID's, and ClassID's, it may be easily extended by using multiple bytes in each packet to encode these entities. Moreover, the protocol may be extended to include additional functionality. For example additional data objects, MsgID's, and ServiceID's may be defined to enable the communications protocol to handle file transfers and/or allow the data objects to be compressed.

Figure 2C:
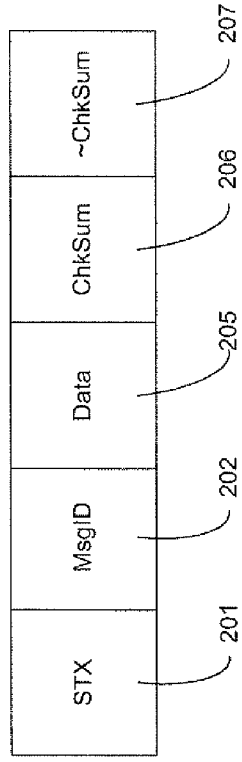
FIG. 2C illustrates the data packet byte structure for an explicit acknowledgement (ACK) message and an explicit not acknowledge (NACK) message in accordance with the present design.

Each explicit response message transmitted by the present design may contain an STX 201 byte, MsgID 202 byte, ClassID 204 byte, Data 205 byte(s), ChkSum 206 byte, and ~Chksum 207 byte arranged in a similar manner as used in an explicit request message. For example, the instrument host, acting as the slave device, may respond to a Get service request message by returning the request data in the explicit response message format illustrated in FIG. 2B. Data fields Data0 to DataN stores the objects data returned by the slave instrument host. In the situation where the GUI host, acting as the master device, sends a Set service request message, the slave instrument host may apply the data to the intended object and not return the objects data as with a Get service request. After responding with the requested data for the Get service request, the slave instrument host may send an acknowledgement message as illustrated in FIG. 2C to inform the master GUI host that the slave instrument host has completed processing the Get service request. The acknowledgment message sent by the slave instrument host indicates to the master GUI host that the slave has accepted the request it initiated The data 205 byte may contain either an indication of acknowledged or not acknowledge.

Figure 3A:
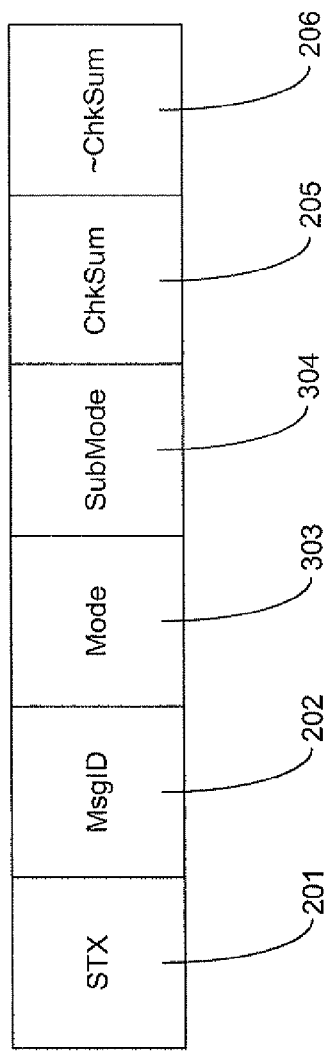
FIG. 3A shows the data packet byte structure for an implicit request message in accordance with the present design.

The present design may send data in an implicit message between two modules in the form of data packets. The present design master module may employ an implicit message request as illustrated in FIG. 3A to request that the slave module report its status on an on-going periodic basis. Following the implicit message request, the slave module may broadcast its status data to the master module on a timed basis. The frequency of broadcast may be defined when initiating the present design's lightweight protocol. In addition, the master module may modify the frequency of status being returned by the slave by sending an implicit message after the system initiates. In addition, the present design master module may employ implicit messaging to command the slave module to switch between different modes of operation or command the slave module to perform a set of specific operations as specified in the mode 303 byte. The implicit messaging method does not attach or convey data and ClassID as found in explicit messaging.

This implicit messaging method may include information in the message requesting the slave module to change modes of operation. In the situation where the master module desires to command the slave module to perform a set of specific operations, the method may employ a sub-mode 304 byte to send the desired command code. The sub-mode 304 byte may contain a code representing a request for sub-mode change or a code representing an operating command.

Figure 3B:
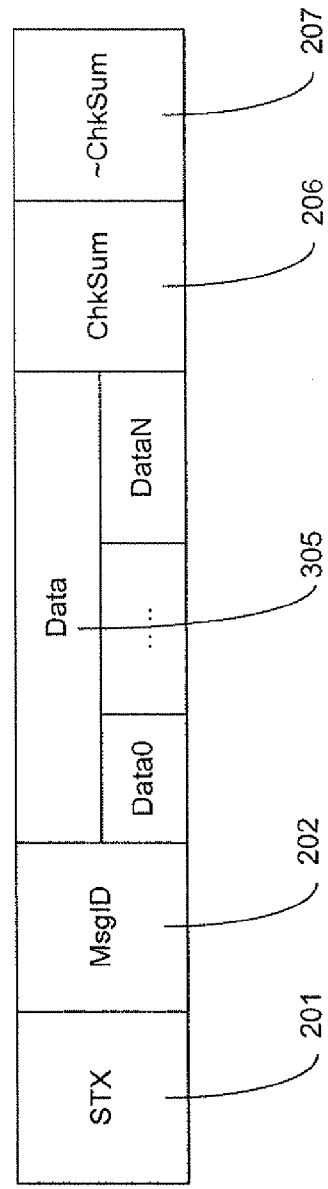
FIG. 3B illustrates the data packet byte structure for an implicit response message in accordance with the present design.

The slave module employing the present protocol may use an implicit response message as illustrated in FIG. 3B to report its status on an on-going periodic basis. The implicit response message may be time triggered enabling the slave module to respond without the master module periodically sending out requests for status. The present design may set the implicit response rate in multiples of hundreds of a millisecond and the data 305 is the field where the actual object resides.

Exchanging Message Packets

Figure 4:
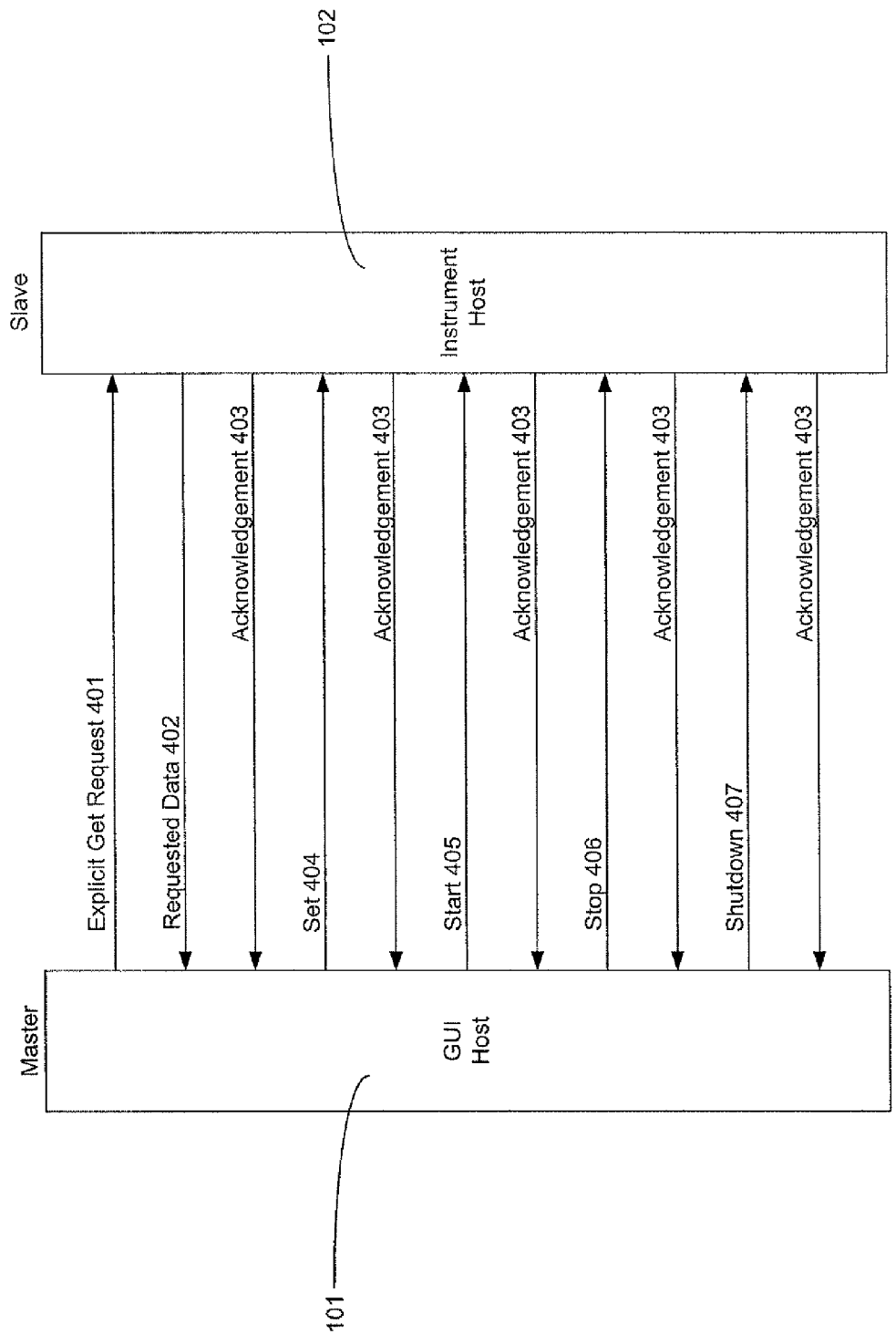
FIG. 4 is the message flow for Get, Set, Start, Stop, and Shutdown service requests in accordance with the present design.

FIG. 4 illustrates exchanging message packets sent via the present designs lightweight protocol message formats. In this example, the GUI host 101 is deemed the master and the instrument host 102 becomes the slave subsystem or module. Acting as the master module, the GUI host 101 may use explicit messaging to send a request to the instrument host 102 to perform a service on the data object specified in the ClassID. The method may include five types of services associated with explicit messaging. The service to be performed may be specified within the ServiceID byte. Depending on the ServiceID, the instrument host 102 slave may respond with an explicit response, or the slave may take some action that does not require a response to be sent back to the initiating master GUI host. The method may specify a Get, Set, Stop, Start, or Shutdown service request.

For example, the master GUI host 101 may send an explicit message Get 401 service, or an explicit Get request, to request the slave instrument host 102 to send the data for the object specified in the ClassID. The slave instrument host 102 module may immediately respond to the request, and may send the requested data 402 to the master GUT host 101. In addition, the slave may send an acknowledgement 403 message to indicate the slave instrument host has completed processing the Get request. The GUI host may send an explicit message Set 404 service request to the instrument host module to send data. The instrument host slave module copies the data sent within the Set request message to its internal object and may apply this data to the current operation. The slave module does not send data back to the master when processing Set service requests. The GUI host may send an explicit message Start 405 service request to the instrument host module to initiate and respond to all foot pedal 104 switch positions. The GUI host may send an explicit message Stop 406 service request to the instrument host module in order to suspend operations and enter into a predefined safe state (e.g. inflate eye, stop aspiration and vacuum while disabling cutting and/or other Phaco actions).

The GUI host may send an explicit message Shutdown 407 service request to the instrument host to command that it gracefully shutdown the system and terminate all running application processes. The slave responds with an acknowledgement message 403 for every request in accordance with the present design.

Figure 5:
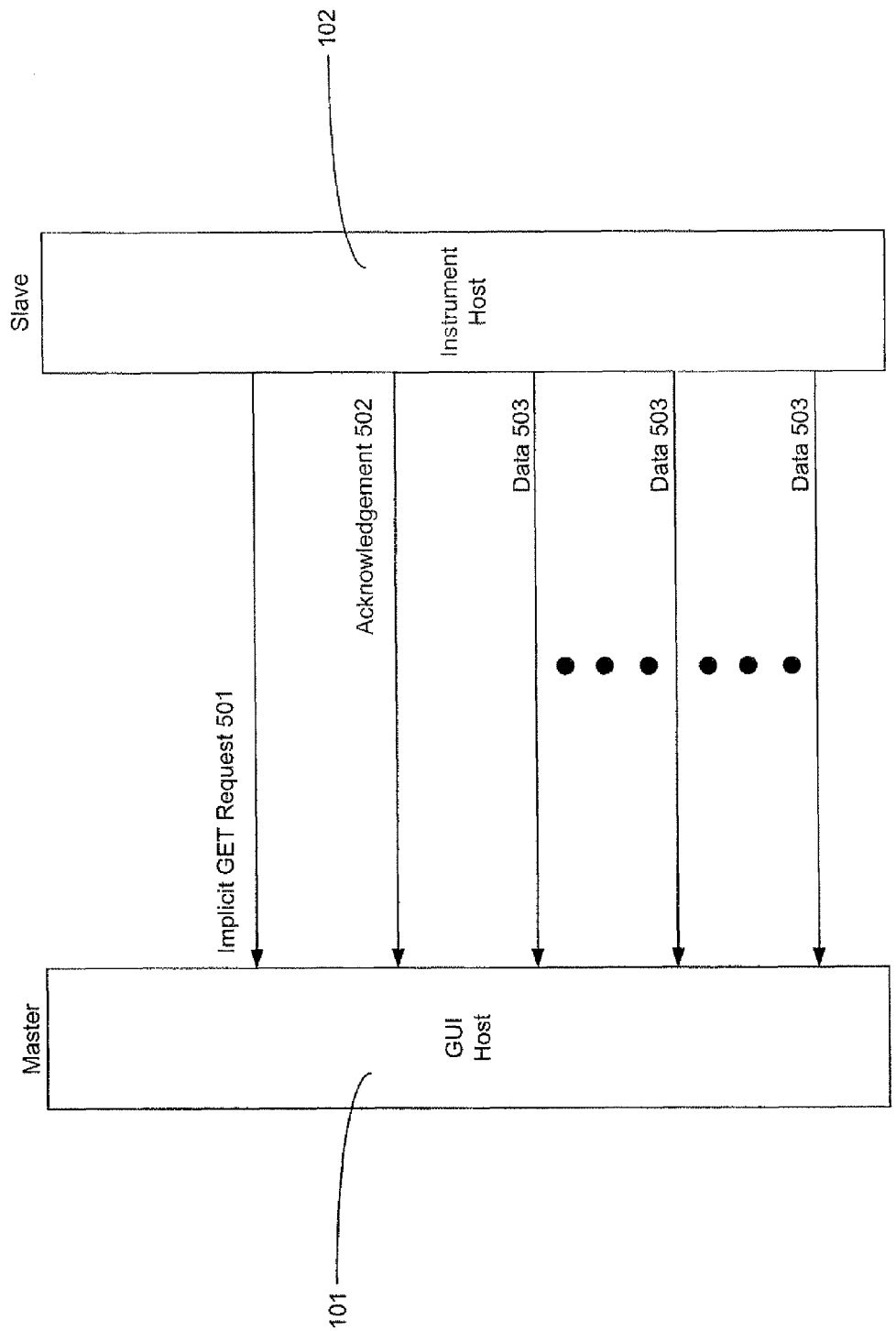
FIG. 5 represents the message flow for requesting data in accordance with the present design.

FIG. 5 illustrates an example of the present design's implicit messaging request and response mechanism. In this example, the GUI host may send an implicit GET request 501 message to command the instrument host to switch to a particular mode or sub-mode, or to perform a task as specified within the implicit request. The instrument host may respond to the implicit request with an acknowledgement 502 message to indicate the instrument host has completed the processing the request. In addition, the instrument host may periodically transmit implicit response data 503 messages back to the GUI host on a predefined time interval.

The present design may enable the master and slave modules to start up as two independent subsystems. After successful startup, each module may communicate a successful boot message to the other module. At this point, the master module may initiate the present design communications protocol by sending an explicit request message to start communications. Upon receipt of this request, the slave module may respond to the master by sending a protocol initiation acknowledgement.

Watchdog Function

The present design may enable a synchronous communications watchdog mechanism, also known as a safety critical communications watchdog or a medical event safety critical communications watchdog. The master module may send an explicit request message to the slave module to start a communications data object. This data object may define two bytes that affect the performance of the communication watchdog. A cyclic interval (CycInt) byte may define the interval, in milliseconds, at which both the master and slave test the communications watchdog. An expected packet rate (EPR) byte may define the initial message timer value. Both the master and slave modules contain a copy of the EPR byte. The present design may decrement the EPR byte value for each elapsed interval as defined by the CycInt byte. Each time a data packet is received from the other module, the EPR byte value is reset to the initial value. If a sufficient number of elapsed intervals are experienced by either module to cause the EPR byte value to be decremented to zero, the module may consider the communications watchdog to have failed and may take appropriate safety critical actions at this point.

For example, the master GUI host may send a Start service request message to the slave instrument host directing the slave to transition to an active state. In the active state, the slave instrument host may respond to foot pedal 104 switch commands and becomes operative in Phaco, Irrigation/Aspiration, Diathermy, Silicon Infusion/Extraction and Vitrectomy mode. In order for the GUI host to keep the instrument host in an active state, the master GUI host continues sending explicit messages before the EPR timer in the instrument host expires. If the EPR timer expires within the instrument host, the instrument host transitions to a safe state. For example, the instrument may transition from the active state to a state wherein the foot pedal is placed or returned to a position zero zone making the Phaco machine inoperative. In order to resume or return to an active state, the master GUI host reinitiates the communications protocol with the slave device.

In a preferred embodiment, as one of ordinary skill in the art will appreciate, the watchdog functionality can be implemented in the form of virtual device drivers known in the art, one residing on the master and one residing on the slave to enable the monitoring of the communications in both directions.

Error Detection and Correction

The present protocol may provide error detection and correction capabilities. For example, in order to ensure the instrument host subsystem operates with valid data at all times, the GUI host may use the explicit Get service request message to retrieve and verify the data sent to the instrument host. In the situation where the GUI host detects that the retrieved data is invalid, the GUI host may send the Stop command to the instrument host and cease transmitting messages. Upon receiving the Stop command, the instrument host may make a transition to the safe state In the event that the Stop command failed to arrive at the instrument host, the instrument host may enter the safe state when the EPR value expires since the GUI host has stopped transmitting messages. Alternatively, the GUI host may also periodically send messages to the instrument host to keep the instrument host in an operative mode and to correct the corrupted data with the information transmitted within subsequent messages.

Regarding checksums, the receiver of every packet recalculates the checksums and compares the checksums to the transmitted checksum values. If the checksums do not match, the packet is assumed invalid. Further, the use of explicit not acknowledge (NAK) packets as described herein may cause specific packets to be retransmitted.

The present communications protocol may alternatively be used between any two modules that are communicating via any asynchronous media. This communications protocol may be realized in either hardware or software. In addition, this communications protocol may be implemented inside another protocol, including but not limited to, Bluetooth and Transmission Control Protocol/Internet Protocol.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for establishing communications between at least two independent software modules in a safety critical system, comprising:
providing a media connection between software modules, wherein the software modules employ a communications protocol and participate in a bi-directional master-slave relationship between a master module and a slave module;
sending messages from said master module to said slave module and from said slave module to said master module, each message comprising an arbitrary length of data comprising optional data, enabling the master module and slave module to detect errors in each message and the master module to control and obtain status from the slave module, and the message further enables the slave module to return data and status information to the master module; and
employing a safety critical communications watchdog function between the master and slave modules, monitoring communications quality between the master and slave modules bi-directionally, wherein the safety critical communications watchdog function comprises the master module and the slave module simultaneously counting time between receiving data packets from the other module and generating a fail condition when a data packet has not been received in a predetermined amount of time,
wherein communications protocol comprises transmitting bytes in a packet consisting of:
a start indication;
a message identifier;
an optional service identifier;
a class identifier;
an arbitrary length of optional data;
a checksum; and
a checksum complement.

2. The method of claim 1, wherein said fail condition results in reduced functionality of at least one system component.

3. The method of claim 1, wherein:
the message identifier describes a type of message the packet contains;
the optional service identifier describes what is to be done with the packet; and
the class identifier describes data contained in the packet.

4. The method of claim 1, wherein the optional service identifier depends on contents of the message identifier.

5. The method of claim 1, wherein the software modules communicate over a low bandwidth media.

6. The method of claim 1, wherein employing the safety critical communications watchdog function comprises providing an expected packet rate and an interval to the software modules, wherein the interval comprises a time interval at which the software modules are to test the safety critical communications watchdog function.

7. The method of claim 1, wherein employing the safety critical communications watchdog comprises monitoring packets sent between the software modules, decreasing a counter in one software module when expected packets are not received for a period of time, and indicating safety critical actions are to be taken when the counter in the one software module decreases below a threshold.

8. A medical device system configured to manage communications therein, the system comprising:
a master device and a slave device;
wherein the master device and the slave device each comprise a plurality of software modules comprising at least two software modules; and
a media connection between the master device and the slave device;
wherein the master device and the slave device are capable of communicating via the plurality of software modules using implicit messaging, the implicit messaging comprising transmitting an implicit message containing no data object description and comprising an arbitrary length of data comprising optional data from said master device to said slave device and from said slave device to said master device to detect errors in and verify integrity of the implicit message;
wherein the plurality of software modules provide a medical event safety critical communications watchdog function to verify communications integrity over the media connection, wherein the safety critical communications watchdog function comprises the master device and the slave device simultaneously counting time between receiving data packets from the other device and generating a fail condition when a data packet has not been received in a predetermined amount of time, wherein the bandwidth efficient communications protocol comprises bytes transmitted using a packet consisting of:

a start indication;
a message identifier;
an optional service identifier;
a class identifier;
an arbitrary length of optional data;
a checksum; and
a checksum complement.

9. The system of claim 8, wherein the fail condition results in reduced functionality of at least one medical system component.

10. The system of claim 8, wherein said arbitrary data is used by the master device to control and obtain status from the slave device, and sending arbitrary data further enables the slave device to return data and status information to the master device.

11. The system of claim 8, wherein:
the message identifier describes a type of message the packet contains;
the optional service identifier describes what is to be done with the packet; and
the class identifier describes data contained in the packet.

12. The system of claim 8, wherein the optional service identifier depends on contents of the message identifier.

13. The system of claim 8, wherein the plurality of software modules communicate over a low bandwidth media.

14. The system of claim 8, wherein employing the medical event safety critical communications watchdog comprises providing an expected packet rate and an interval to the plurality of software modules, wherein the interval comprises a time interval at which the plurality of software modules are to test the medical event safety critical communications watchdog.

15. The system of claim 8, wherein employing the medical device safety critical communications watchdog comprises monitoring packets sent between the plurality of software modules, decreasing a counter in one software module when expected packets are not received for a period of time, and indicating medical safety critical actions are to be taken when the counter in the one software module decreases below a threshold.

16. A safety critical system comprising:
a master medical device; and
a slave medical device,
wherein the devices comprise a plurality of software modules capable of communicating via a bandwidth efficient communications protocol, and wherein the communications protocol comprises bytes transmitted using a packet consisting of:
a start indication;
a message identifier;
an optional service identifier;
a class identifier;
an arbitrary length of data pertinent to the medical device comprising optional data, wherein length of the arbitrary length of data depends upon at least one of the class identifier, message identifier, and optional service identifier;
a checksum; and
a checksum complement;
and wherein the master medical device and the slave medical device each provide a medical event safety critical communications watchdog function to verify communications integrity over the media connection, wherein the safety critical communications watchdog function comprises the master medical device and the slave medical device simultaneously counting time between receiving data packets from the other medical device and generating a fail condition when a data packet has not been received in a predetermined amount of time.

17. The system of claim 16, wherein:
the message identifier describes a type of medical related message the packet contains;
the optional service identifier describes what is to be done with the packet within the medical devices; and
the class identifier describes medical device data contained in the packet.

18. The system of claim 16, wherein the optional service identifier depends on contents of the message identifier.

* * * * *